E. E. CULLEN.
FLY TRAP.
APPLICATION FILED APR. 24, 1912.
1,089,399.
Patented Mar. 10, 1914.
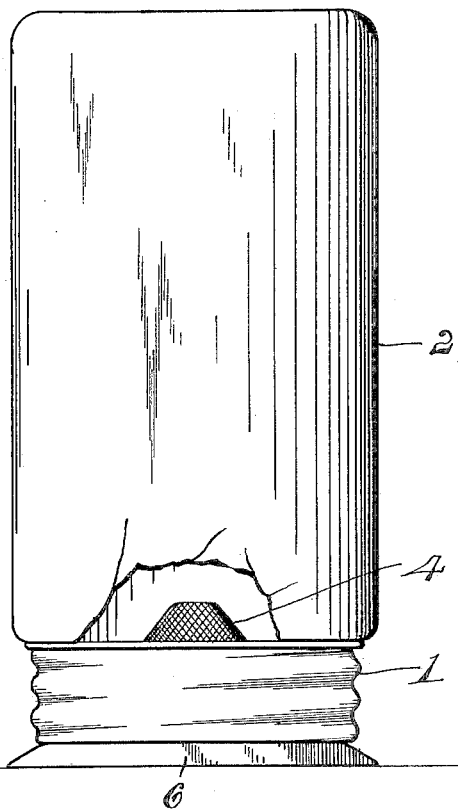
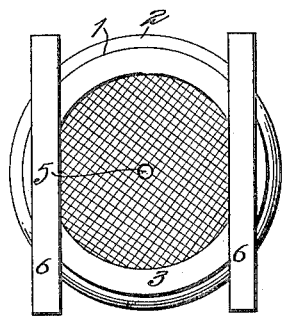
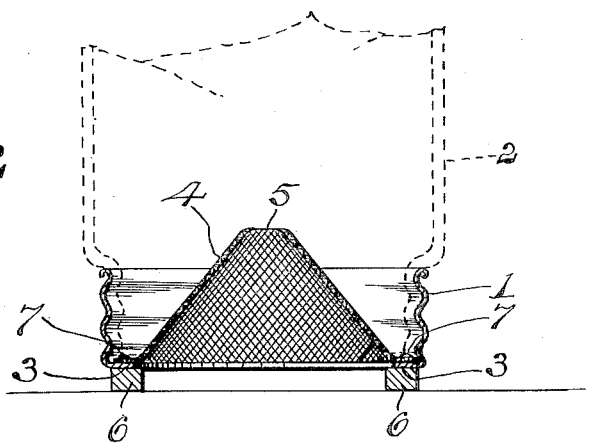
Witnesses
A. M. Shannon.
A. M. Dorr
Inventor
Ernest E. Cullen
By 
Attorneys

UNITED STATES PATENT OFFICE.

ERNEST E. CULLEN, OF DETROIT, MICHIGAN, ASSIGNOR, BY MESNE ASSIGNMENTS, TO ALICE M. BEEBE, OF DETROIT, MICHIGAN.

FLY-TRAP.

1,089,399.  Specification of Letters Patent.  Patented Mar. 10, 1914.

Application filed April 24, 1912. Serial No. 692,783.

*To all whom it may concern:*

Be it known that I, ERNEST E. CULLEN, a citizen of the United States of America, residing at Detroit, in the county of Wayne and State of Michigan, have invented certain new and useful Improvements in Fly-Traps, of which the following is a specification, reference being had therein to the accompanying drawings.

This invention relates to improvements in fly traps and more particularly to an attachment for fruit jars whereby such a glass jar may be utilized as the receptacle of a fly trap for confining flies, the object of the invention being to provide a very cheap and simple device which may be screwed upon the ordinary glass fruit jar in place of its cap and form a trap mouth for admitting flies to the jar and confining them therein.

To this end the invention consists in the matters hereinafter set forth and more particularly pointed out in the claims, reference being had to the accompanying drawing in which—

Figure 1 is a side elevation of a device embodying the invention with a glass fruit jar in place thereon, portions of the jar being broken away to show the construction; Fig. 2 is a vertical section on the line $x$—$x$ of Fig. 1 with the jar shown in dotted lines, and Fig. 3 is a bottom plan of the device on a smaller scale than that shown in Figs. 1 and 2.

The attachment embodying the invention comprises an annular sheet metal member 1 the vertical wall or upstanding flange of which is suitably corrugated to form a screwthread for the engagement of the screwthreaded neck of an ordinary glass fruit jar 2 and said member is also formed with a flange 3 extending inwardly from the bottom edge of said wall to the inner side of which is secured in any suitable manner, a member forming a trap mouth comprising an upwardly extending cone 4 formed of wire netting or other suitable material having an opening 5 at its apex. Strips 6 of wood or other suitable material are secured in any suitable manner, as by nails 7 to the flange 3 and form a base or legs to support the device a short distance from the surface of a table or other support upon which it is placed. These strips are preferably of a length substantially equal to the diameter of the annular member to give an extended base and firmly support the attachment with the fruit jar engaged therewith in an inverted position, and for also forming a run-way between them for the flies which directs them beneath the open large end of the cone. By securing the strips or legs 6 at each side of the annular member, the entire lower end of the cone is open so that the flies can pass in freely and there is nothing in the center of the base to obstruct the light. The light shining through the jar and ring 1 thus makes a bright spot between the legs upon the supporting surface where the trap is placed thus attracting the insects which will then crawl up the inner surface of the cone and in through the opening at its top. If found desirable the interior of the cone 2 may be smeared with any sticky substance to attract the flies and as the entire lower end or mouth of the jar is closed only by a screen cone, the flies will readily discover this substance and crawl up the sides of the cone which are very accessible. The arrangement is such that the flies may fly up to the inlet opening 5 after passing beneath the flange 3 and will do so as the light is obstructed slightly by the jar and cone.

By means of this very simple and cheap attachment the common screw top fruit jar may be converted into a fly trap and as every housewife is supplied with these jars, it is only necessary for her to buy the attachment.

Obviously the strips 6 may be made in any desired form and of any suitable material, and other changes in the form and arrangement of parts may be made without departing from the spirit of my invention, and I therefore do not wish to limit myself to the particular form or construction shown.

Having thus fully described my invention what I claim is:—

1. An attachment for fruit jars comprising an annular member having an upstanding screwthreaded flange to receive the screwthreaded neck of a glass fruit jar, and provided with an inwardly extending flange, a conical member formed of wire screen secured at its base to the inwardly extending flange on the annular member and provided with an opening at its apex, and members forming supporting legs secured to the inwardly extending flange on said annular member and having their ends terminating in a plane defined by the circumference of said jar.

2. An attachment for fruit jars comprising an annular member having an upstanding screwthreaded flange to receive the screwthreaded neck of a glass fruit jar and provided with an inwardly extending flange, a conical member formed of wire screen secured at its base to the inwardly extending flange on the annular member and provided with an opening at its apex, strips secured to said inwardly extending flange at diametrically opposite sides thereof and arranged in parallelism with the ends of said strips terminating in a plane defined by the circumference of said jar to form supports and forming between them a run-way leading to the open lower end of the conical member.

In testimony whereof I affix my signature in presence of two witnesses.

ERNEST E. CULLEN.

Witnesses:
ANNA M. DORR,
LEWIS E. FLANDERS.